(12) United States Patent
Grgac et al.

(10) Patent No.: US 9,950,471 B2
(45) Date of Patent: Apr. 24, 2018

(54) RESISTIVE IMPLANT WELDING OF THERMOPLASTIC MATERIAL WITH BUTT JOINTS

(71) Applicant: Magna International Inc., Aurora (CA)

(72) Inventors: Steven Grgac, Mississauga (CA); Bradford D. Armstrong, Barrie (CA)

(73) Assignee: Magna International Inc., Aurora (CA)

( * ) Notice: Subject to any disclaimer, the term of this patent is extended or adjusted under 35 U.S.C. 154(b) by 103 days.

(21) Appl. No.: 14/874,619

(22) Filed: Oct. 5, 2015

(65) Prior Publication Data

US 2016/0052204 A1 Feb. 25, 2016

Related U.S. Application Data

(62) Division of application No. 12/746,948, filed as application No. PCT/CA2008/002141 on Dec. 11, 2008, now abandoned.
(Continued)

(51) Int. Cl.
*B29C 65/00* (2006.01)
*B29C 65/34* (2006.01)
(Continued)

(52) U.S. Cl.
CPC ...... *B29C 66/73921* (2013.01); *B29C 65/344* (2013.01); *B29C 66/1248* (2013.01);
(Continued)

(58) Field of Classification Search
CPC ... B29C 66/73921; B29C 66/71; B29C 66/54; B29C 66/721; B29C 65/344; B29C 66/12449; B29C 66/12463; B29C 66/12469; B29C 66/1248; B29C 66/43; B29C 66/7212; B29C 66/8322;
(Continued)

(56) References Cited

U.S. PATENT DOCUMENTS 2,851,354 A 9/1958 Scanlan et al.
3,002,834 A 10/1961 Di Pasquale
(Continued)

OTHER PUBLICATIONS

Bates et al. "Resisitive Implant Welding of Glass Fiber Reinforced Polypropylene Compounds", SAE 2006 World Congress & Exhibition, Apr. 2006, Published by Society of Automotive Engineers, SAE Technical Papers, Document No. 2006-01-0332, *see whole document*.
(Continued)

*Primary Examiner* — Nathan L Van Sell
(74) *Attorney, Agent, or Firm* — Warn Partners, P.C.

(57) ABSTRACT

A method for forming butt joints between thermoplastic members by resistive implant welding. A tongue is formed on one member to be joined and a complementary groove is formed in the other member. A resistive implant is placed between the tongue and the groove which are then pressed together by an applied pressure. An electric current is run through the resistive implant to melt a portion of the thermoplastic material of both the tongue and groove, and the melted plastic intermingles through the implant. When the electric current is removed, the plastic cools, forming a weld.

4 Claims, 4 Drawing Sheets

Related U.S. Application Data

(60) Provisional application No. 61/007,239, filed on Dec. 11, 2007.

(51) Int. Cl.
  *B60R 13/00* (2006.01)
  *B29L 31/30* (2006.01)
  *B29K 309/08* (2006.01)
  *B29K 105/06* (2006.01)
  *B29K 101/12* (2006.01)
  *B29K 23/00* (2006.01)

(52) U.S. Cl.
  CPC .. *B29C 66/12449* (2013.01); *B29C 66/12463* (2013.01); *B29C 66/12469* (2013.01); *B29C 66/43* (2013.01); *B29C 66/54* (2013.01); *B29C 66/71* (2013.01); *B29C 66/721* (2013.01); *B60R 13/00* (2013.01); *B29C 65/3476* (2013.01); *B29C 66/7212* (2013.01); *B29C 66/8322* (2013.01); *B29K 2023/12* (2013.01); *B29K 2101/12* (2013.01); *B29K 2105/06* (2013.01); *B29K 2309/08* (2013.01); *B29L 2031/30* (2013.01); *Y10T 428/19* (2015.01)

(58) Field of Classification Search
  CPC ... B29C 65/3476; B60R 13/00; Y10T 428/19; B29K 2023/12
  See application file for complete search history.

(56) References Cited

U.S. PATENT DOCUMENTS

| | | | |
|---|---|---|---|
| 3,383,489 A | 5/1968 | Ciranko | |
| 5,620,208 A | 4/1997 | Kirkham | |
| 6,176,953 B1* | 1/2001 | Landreth | B29C 65/08 |
| | | | 156/309.6 |
| 6,284,089 B1* | 9/2001 | Anderson | B29C 65/5042 |
| | | | 156/304.3 |
| 6,368,448 B1 | 4/2002 | Okamura et al. | |
| 2004/0231628 A1* | 11/2004 | Jones | B29C 66/1142 |
| | | | 123/184.61 |
| 2004/0249727 A1 | 12/2004 | Kurz | |
| 2007/0262057 A1 | 11/2007 | Hengel et al. | |
| 2008/0251665 A1 | 10/2008 | Armstrong et al. | |

OTHER PUBLICATIONS

Kagan et al, "Recent Advances and Challenges in Induction Welding of Reinforced Nylon in Automotive Applications", 2004, Published by Society of Automotive Engineers, SAE Technical Papers, Document No. 2004-01-0733 *see whole document*.

Malloy, R.A., "Plastic Part Design for Injection Moldings: An Introduction", Published by Hanser Gardner Publications, Jan. 1994, ISBN-10 1569901295 *see pp. 429 and 430, figure 6. 123*.

\* cited by examiner

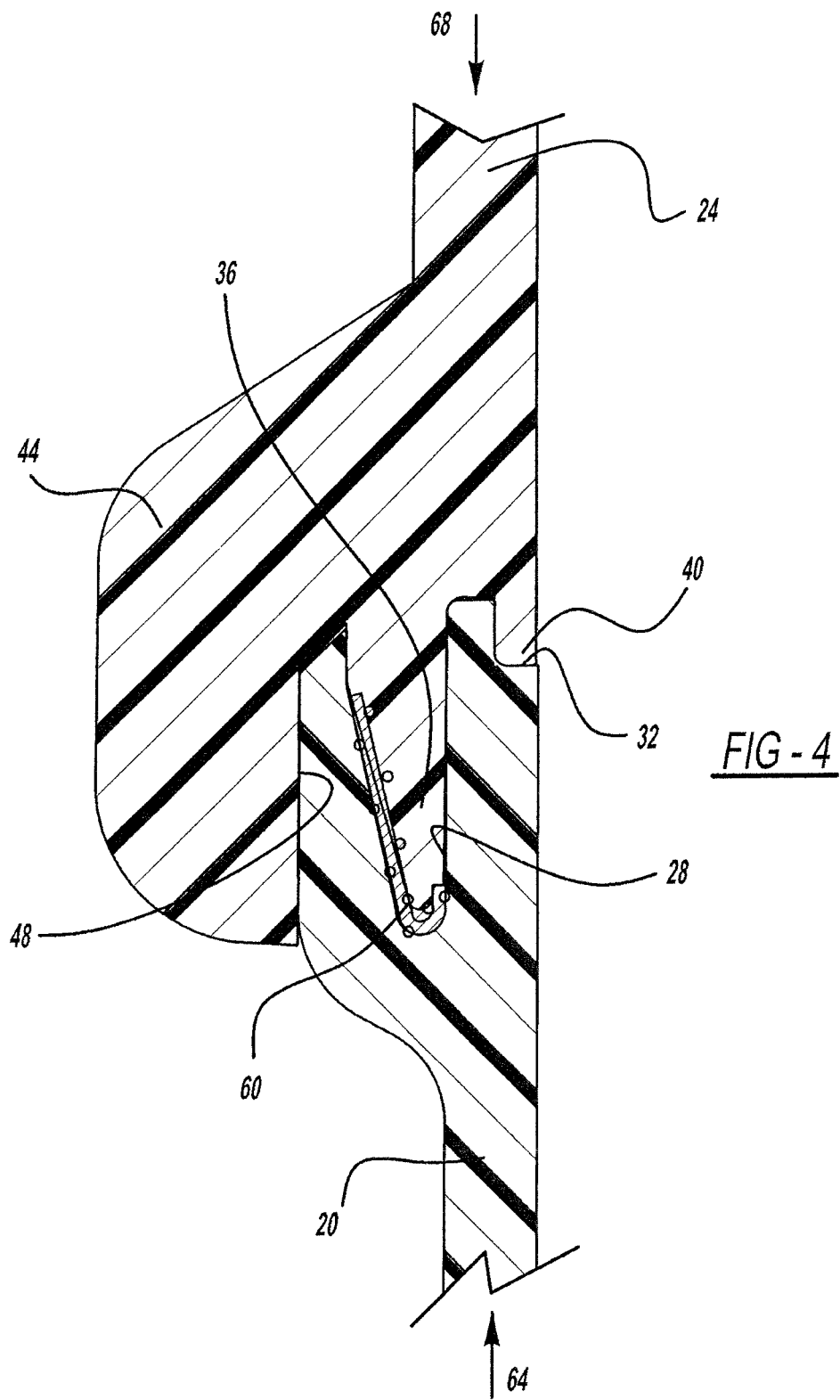

RESISTIVE IMPLANT WELDING OF THERMOPLASTIC MATERIAL WITH BUTT JOINTS

CROSS-REFERENCE TO RELATED APPLICATIONS

This is a divisional application claiming priority to U.S. patent application Ser. No. 12/746,948, filed Jul. 21, 2010, which is a national stage application of PCT International Application of U.S. patent application Ser. No. 61/007,239 filed on Dec. 11, 2007. The disclosures of the above applications are incorporated herein by reference.

FIELD OF THE INVENTION

The present invention relates to resistive implant welding of thermoplastic components. More specifically, the present invention relates to a method and system for forming butt joints of thermoplastic components using resistive implant welding.

BACKGROUND OF THE INVENTION

A need exists to join thermoplastic components, such as those formed from glass fiber reinforced polypropylene or the like, to other plastic components formed of similar materials. To date, such joining has been achieved via adhesives, mechanical fasteners, laser welding and/or sonic or vibration welding.

More recently, lap welds have been formed to join thermoplastic components using resistive implant welding techniques. In general, the technology of forming lap welds with resistive implant welding is described in, "Resistive Implant Welding of Glass Fiber Reinforced Polypropylene Compounds", by Bates, Tan, Zak and Mah, published by the Society of Automotive Engineers, SAE Technical Papers, document number 2006-01-0332 and the contents of this paper are included herein, in its entirety, by reference.

While resistive implant welding is proving to be a promising technique for forming lap welds between thermoplastic materials, to date resistive implant welding techniques have only been able to form lap welds which limits the use of these techniques.

SUMMARY OF THE INVENTION

It is an object of the present invention to provide a novel method and system for using resistive implant welding to form butt joints of components formed of thermoplastic materials which obviates or mitigates at least one disadvantage of the prior art.

According to a first aspect of the present invention, there is provided a method of forming a welded butt joint between first and second thermoplastic components, the method comprising the steps of: forming a tongue along an edge of a first thermoplastic component to be joined; forming a groove along an edge of a second thermoplastic component to be joined; inserting the tongue into the groove with a resistive implant located therebetween; applying pressure to the first thermoplastic component and the second thermoplastic component to urge the tongue into the groove while applying an electric current to the resistive implant for a preselected time to melt a portion of the thermoplastic material of the tongue and groove; and removing the electric current and allowing the melted thermoplastic material to resolidify while maintaining the pressure to form a welded butt joint between the first and second thermoplastic components.

The present invention provides a method for forming butt joints between thermoplastic members by resistive implant welding. A tongue if formed on one member to be joined and a complementary groove is formed in the other member. A resistive implant is placed between the tongue and the groove which are then pressed together by an applied pressure. An electric current is run through the resistive implant to melt a portion of the thermoplastic material of the tongue and groove and the melted plastic intermingles, through the implant. When the electric current is removed, the plastic cools, forming a weld.

BRIEF DESCRIPTION OF THE DRAWINGS

Preferred embodiments of the present invention will now be described, by way of example only, with reference to the attached Figures, wherein:

FIG. 4 shows sectional side view of the component of FIG. 2, where the pair of thermoplastic components are positioned relative to one another before the weld has been formed.

DETAILED DESCRIPTION OF THE INVENTION

As used herein, the term "plastic" is intended to comprise thermoplastic materials in general and such thermoplastic materials can include added materials, such as glass fibers, to alter their mechanical properties. While some of the following discussion makes specific reference to glass fiber reinforced polypropylene plastics, the present invention is not limited to use with this particular reinforced thermoplastic material.

As discussed above, resistive implant welding is known. In general, the technology of resistive implant welding is described in, "Resistive Implant Welding of Glass Fiber Reinforced Polypropylene Compounds", by Bates, Tan, Zak and Mah, published by the Society of Automotive Engineers, SAE Technical Papers, document number 2006-01-0332 and the contents of this paper are included herein, in its entirety, by reference.

However, existing resistive implant welding is used to connect plastic components via lap joints. In many circumstances, it is desired to have components joined by a butt joint. In particular, as lap joints result in joints with changing profiles, butt joints would be preferred for joints on cosmetically significant thermoplastic components, such as exterior body panels on a vehicle.

To address this issue, the present inventors have developed structures and methods for joining two or more panels of thermoplastic materials via butt joints.

Figure 1:
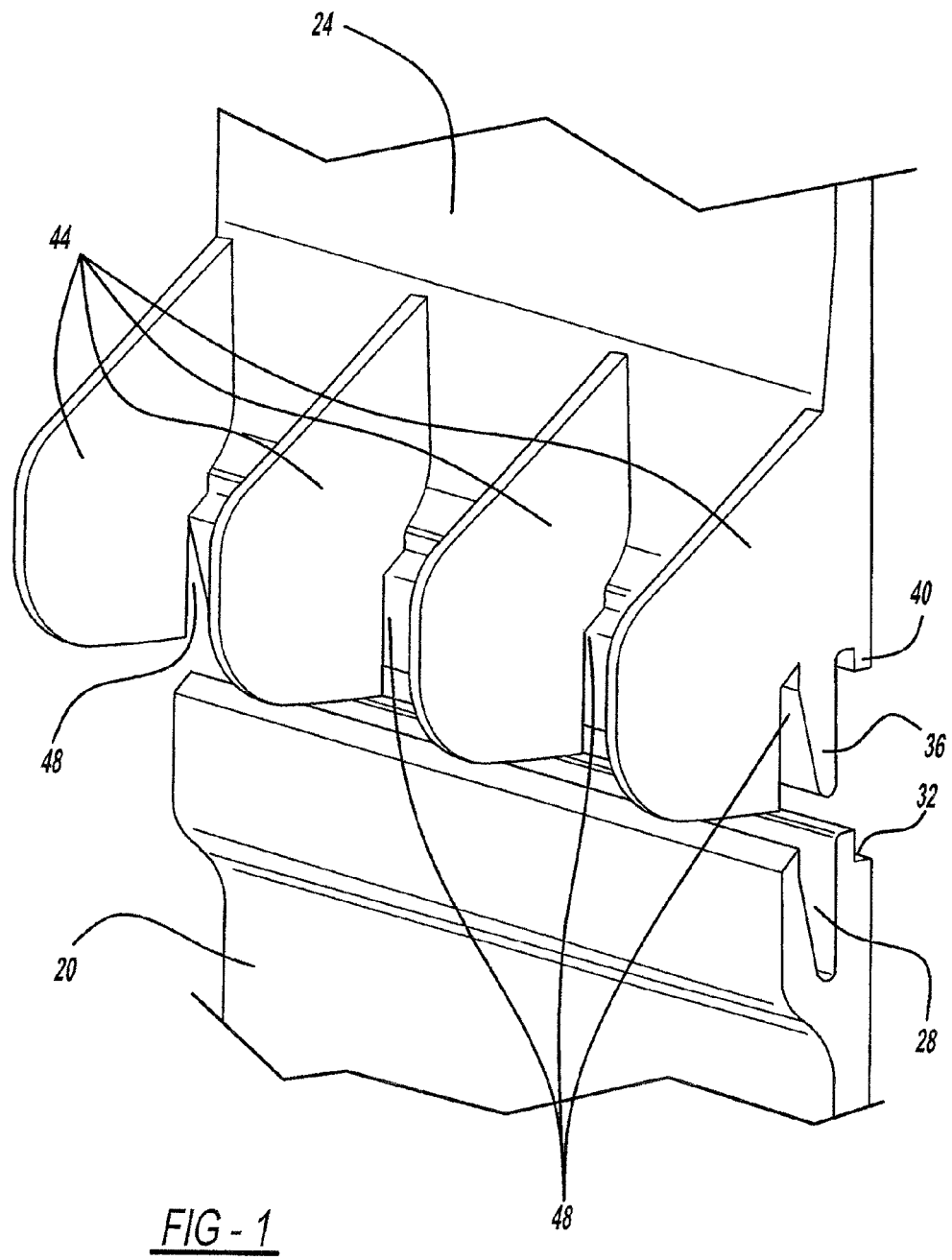
FIG. 1 shows a first exploded view of the rear sides of a pair of thermoplastic components to be joined, according to the present invention.

Specifically, FIG. 1 shows edge portions of a first panel 20 and a second panel 24, each of which is formed of a thermoplastic material, which are to be joined by a butt joint.

Referring to the Figures generally, the first panel 20 includes a groove 28 along the rear face of the first panel 20 at the edge to be joined. The first panel 20 also includes a small notch 32 along the front face of panel 20 adjacent the edge to be joined.

As is also shown, the second panel 24 includes a tongue 36, which is complementary in shape to the groove 28. The tongue 36 runs along the rear face of second panel 24 at the edge to be joined. The second panel also includes a flange 40 which is complementary in shape to the notch 32, and the flange 40 extends along the edge of second panel 24.

Second panel 24 further includes a series of support members 44, which extend at intervals along the edge of second panel 24 to be joined. Each of the support members 44 extend perpendicularly from the rear side of the second panel 24, and each of the support members 44 also include a slot 48 which abuts the rear outer surface of groove 28.

Each of the first panel 20 and second panel 24 may be formed in any appropriate manner, such as by injection molding, which can be used to form the panels 20 and 24 in the desired manner with the above-described structures, including groove 28, notch 32, tongue 36, flange 40 and support members 44.

Figure 2:
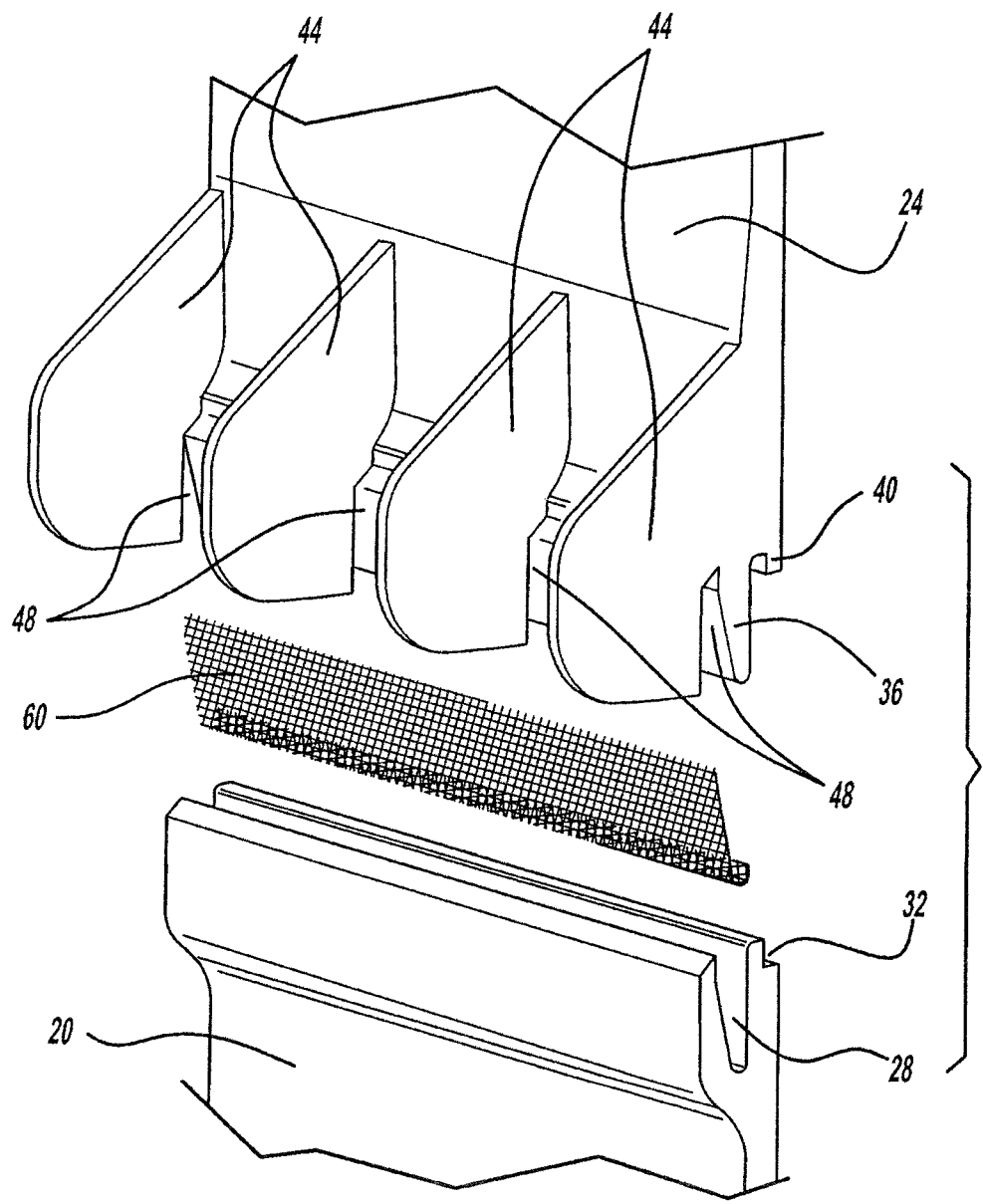
FIG. 2 shows a second exploded view, similar to that of FIG. 1, wherein a resistive implant has been positioned between a pair of thermoplastic components to be joined, according to the present invention.
Figure 3:
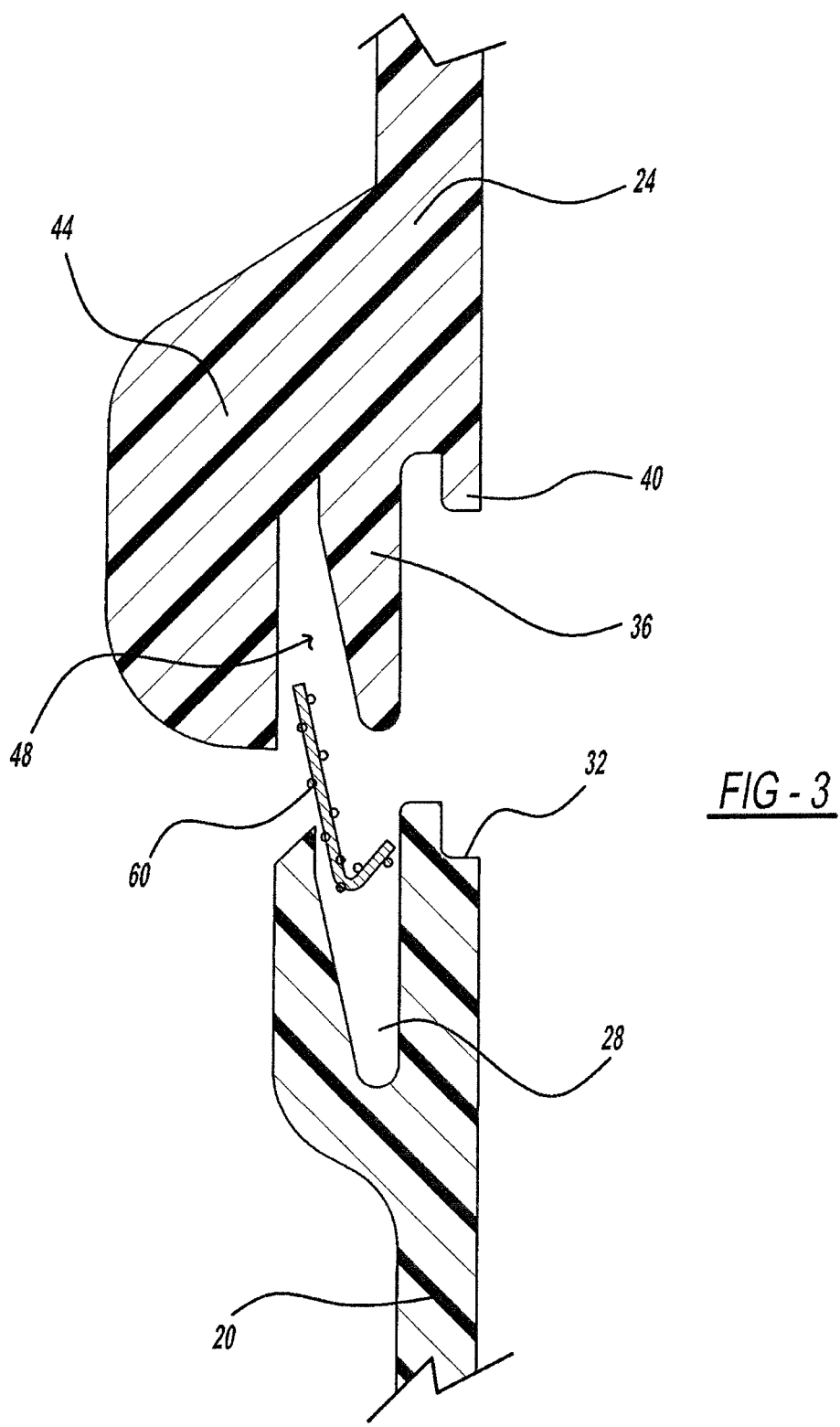
FIG. 3 shows a sectional side view of the components shown in FIG. 2.

When it is desired to join first panel 20 and second panel 24 with a butt weld, a resistive implant 60 is placed between tongue 36 and groove 28, as shown in FIGS. 2 and 3. In a presently preferred embodiment of the invention, resistive implant 60 is a stainless steel mesh with wires of 0.009 inches diameter woven in a plain weave of sixteen wires to the inch. However, as will be apparent to those of skill in the art, the present invention is not limited to this type or configuration of resistive implant, and any suitable resistive element, as will occur to those of skill in the art, may be employed.

When resistive element 60 is properly placed, tongue 36 of second panel 24 is inserted into groove 28 of first panel 20, as shown in FIG. 4. The dimensions of the groove 28 and tongue 36 are selected such that, when the resistive implant 60 is in place, a substantially tight fit is obtained between the tongue 36 and groove 28 to avoid any gaps, voids, or other empty volumes, except any such volumes resulting from the structure of resistive implant 60, such as the gaps in the mesh if a resistive implant with a mesh structure is employed.

Pressure is then applied, as indicated by arrows 64 and 68 in FIG. 4, to the interface between tongue 36 and groove 28. An electric current is then passed through resistive implant 60 resulting in the heating of the interface between the groove 28 and the tongue 36, melting the thermoplastic material. The melted thermoplastic material of the groove 28 and the melted thermoplastic material of the tongue 36 intermingle through the mesh of the resistive implant 60 because of the pressure applied to the first panel 20 and the second panel 24.

After a pre-selected time, the electric current is removed from the resistive implant 60, the joint formed between the groove 28 and the tongue 36 is allowed to cool, and the pressure applied to first panel 20 and second panel 24 is then removed. When sufficiently cooled, the joint between the panels 20 and 24 is complete.

Notch 32 and flange 40 serve to provide a smooth surface to the weld on the front face of panels 20 and 24, and prevent any over-engagement of panels 20 and 24 during the welding operation. Further, the notch 32 and flange 40 cooperate with the support members 44 to prevent any bending moment about the interface between the groove 28 and the tongue 36 during the welding operation.

As should be apparent to those of skill in the art, while it is presently preferred that support members 44 be integrally formed on at least the second panel 24, it is also contemplated that support members 44 may be omitted, and support instead may be provided by a die or other forming member which is placed adjacent the rear of the groove 28 during the welding operation.

The present invention provides a method for forming butt joints between thermoplastic members by resistive implant welding. A tongue is formed on one member to be joined and a complementary groove is formed in the other member. A resistive implant is placed between the tongue and the groove which are then pressed together by an applied pressure. An electric current is run through the resistive implant to melt a portion of the thermoplastic material of the tongue and groove; the melted plastic of the tongue and groove intermingles through the implant. When the electric current is removed, the plastic cools, forming a weld.

The above-described embodiments of the invention are intended to be examples of the present invention and alterations and modifications may be effected thereto, by those of skill in the art, without departing from the scope of the invention which is defined solely by the claims appended hereto.

What is claimed is:

1. An assembly forming a butt joint connected together through the use of resistive implant welding comprising:
   a butt joint formed from a first panel and a second panel connected together wherein the butt joint joins the first panel and second panel at an edge;
   a groove formed in a portion of said first panel along a rear side of the first panel at the edge;
   a notch formed in said first panel, said notch extending along said first panel and is substantially parallel to said groove;
   a tongue portion formed in a portion of said second panel, said tongue portion complementary in shape to, and operable for being positioned in, said groove;
   a flange formed on said second panel and complementary in shape to said notch, said flange being operable to be engaged with said notch when said tongue portion is positioned in said groove;
   a smooth surface on a front face of said first panel and said second panel created by said flange engaging said notch;
   a resistive implant operable for being positioned in said groove and in contact with said tongue portion;
   an interface between the groove and the tongue, wherein the interface includes melted thermoplastic material of the groove and melted thermoplastic material of the tongue intermingled through the resistive implant, thereby integrating the tongue and groove;
   a series of support members on said second panel and extending perpendicularly away from a rear side of said second panel at intervals along said rear side of said second panel, wherein said series of support members are operable for preventing a bending movement about said groove and said tongue when said tongue is disposed in said groove; and
   at least one slot formed between said series of support members and said tongue portion, abutting the rear side of the first panel said at least one slot operable for receiving an outer surface of said groove.

2. The assembly connected together through the use of resistive implant welding of claim 1, wherein as said current is applied to said resistive implant, a pressure is applied to said first panel and said second panel, further joining said first panel to said second panel.

3. The assembly connected together through the use of resistive implant welding of claim 1, said resistive implant further comprising a wire mesh configured as a plain weave of approximately sixteen wires per inch.

4. The assembly connected together through the use of resistive implant welding of claim 1 said wire mesh further comprising wires of substantially 0.009 inches in diameter.

\* \* \* \* \*